(12) United States Patent
Okuno

(10) Patent No.: US 8,023,008 B2
(45) Date of Patent: Sep. 20, 2011

(54) IMAGING DEVICE

(75) Inventor: Akira Okuno, Osaka (JP)

(73) Assignee: Sony Corporation, Tokyo (JP)

( * ) Notice: Subject to any disclaimer, the term of this patent is extended or adjusted under 35 U.S.C. 154(b) by 320 days.

(21) Appl. No.: 11/908,455

(22) PCT Filed: Jan. 12, 2007

(86) PCT No.: PCT/JP2007/050289
§ 371 (c)(1),
(2), (4) Date: Jan. 9, 2009

(87) PCT Pub. No.: WO2007/080948
PCT Pub. Date: Jul. 19, 2007

(65) Prior Publication Data
US 2010/0146722 A1 Jun. 17, 2010

(30) Foreign Application Priority Data
Jan. 12, 2006 (JP) .................. 2006-004704

(51) Int. Cl.
H04N 5/217 (2011.01)
H04N 5/225 (2006.01)
(52) U.S. Cl. .................... 348/241; 348/374
(58) Field of Classification Search ............ 348/208.2, 348/208.4, 208.5, 208.7, 241, 374; 396/50, 396/52–55
See application file for complete search history.

(56) References Cited

U.S. PATENT DOCUMENTS
2005/0104997 A1* 5/2005 Nonaka ............ 348/360

FOREIGN PATENT DOCUMENTS
| JP | 2003 338968 | 11/2003 |
| JP | 2004 242158 | 8/2004 |
| JP | 2005 151233 | 6/2005 |
| JP | 2006 293036 | 10/2006 |

OTHER PUBLICATIONS

Machine Translation of JP 2006-293036 to Noto published Oct. 26, 2006.*

* cited by examiner

Primary Examiner — Tuan Ho
Assistant Examiner — Daniel M Pasiewicz
(74) Attorney, Agent, or Firm — Oblon, Spivak, McClelland, Maier & Neustadt, L.L.P.

(57) ABSTRACT

An imaging apparatus capable of preventing redeposition of dust on an imaging device to efficiently achieve dust removal. The imaging apparatus includes a driving device vibrating the imaging device, a posture detecting device detecting a posture of the imaging apparatus, and a controller allowing the imaging device to be vibrated on the condition that the detected posture of the imaging apparatus is a predetermined posture to remove dust deposited on the imaging device. For example, the imaging device is vibrated on the condition that the posture of the imaging apparatus is a normal posture. Alternatively, the imaging device is vibrated so long as it is determined that an opening for lens mounting in a body of the apparatus is pointed down and a photographic lens is not mounted.

9 Claims, 13 Drawing Sheets (a)

(b)

(c)

IMAGING DEVICE

TECHNICAL FIELD

The present invention relates to imaging apparatuses, such as digital cameras.

BACKGROUND ART

In a digital camera which serves as an imaging apparatus for capturing an image using an imaging device, such as a CCD, deposition of dust, such as fine particles of a substance or dirt, on the imaging device causes a degradation in quality of the captured image. Particularly, in a lens interchangeable digital camera, dust easily enters the camera during change of a lens. Disadvantageously, deposition of dust on an imaging device relatively often occurs.

As a technique of dealing with such deposition of dust on an imaging device, for example, Japanese Unexamined Patent Application Publication No. 2005-159711 discloses an approach.

As disclosed in Japanese Unexamined Patent Application Publication No. 2005-159711, a digital camera has a "playback mode", a "shooting mode", and a "dust removal mode". In the dust removal mode, a CCD (imaging device) is vibrated to remove dust on the imaging device.

In the above-described technique disclosed in Japanese Unexamined Patent Application Publication No. 2005-159711, unfortunately, dust temporarily removed from the imaging device by vibration may be again deposited on the imaging device according to circumstances when the vibration is applied to the imaging device. Assuming that an interchangeable lens is mounted on the camera, for example, when the imaging device is driven and dust on the imaging device is temporarily removed, the removed dust is deposited on another part in the camera. In this case, dust may be moved by vibration applied to the camera while the camera being carried and may be again deposited on the imaging device.

A first challenge of the present invention is to provide an imaging apparatus capable of preventing redeposition of dust on an imaging device to efficiently remove dust.

In the above-described technique disclosed in Japanese Unexamined Patent Application Publication No. 2005-159711, dust is removed in the dust removal mode. During the shooting mode, the imaging device is not vibrated in order to remove dust. Accordingly, when dust is again deposited on the imaging device during shooting for any reason, it is necessary to perform an operation of switching the mode to the dust removal mode in order to remove dust.

A second challenge of the present invention is therefore to provide an imaging apparatus capable of appropriately removing dust during shooting without switching the apparatus to a dust removal mode.

DISCLOSURE OF INVENTION

An exemplary emodiment provides an imaging apparatus including an imaging device to convert an optical image of a subject into an image signal, a driving unit to vibrate the imaging device, and a control unit to control the driving unit to vibrate the imaging device during reading of the image signal from the imaging device after a completion of exposure of an image shot by the imaging device to remove dust deposited on the imaging device.

Another embodiment provides an imaging apparatus including an imaging device to convert an optical image of a subject into an image signal, and a means for vibrating the imaging device after completion of an exposure of an image shot by the imaging device during reading of an image signal from the imaging device.

Embodiments may include a means for displaying an afterview image of the shot image, wherein the means for vibrating vibrates the imaging device during display of the after view image of the shot image.

In other embodiments, the means for vibrating vibrates the imaging device for a predetermined period after completion of the exposure of the image shot by the imaging device.

In some embodiments, the means for vibrating stops the vibration of the imaging device when a shooting preparation instruction related to a next image to be shot is given during the predetermined period.

An exemplary benefit of the imaging device being vibrated after the completion of exposure of the image shot by the imaging device to remove dust deposited on the imaging device is that dust can be removed without the operation of switching the mode or at an early stage after the completion of exposure can be achieved.

BEST MODE FOR CARRYING OUT THE INVENTION

Embodiments of the present invention will now be described below with reference to the drawings.

1. First Embodiment

<1-1. Structure>

Figure 1:
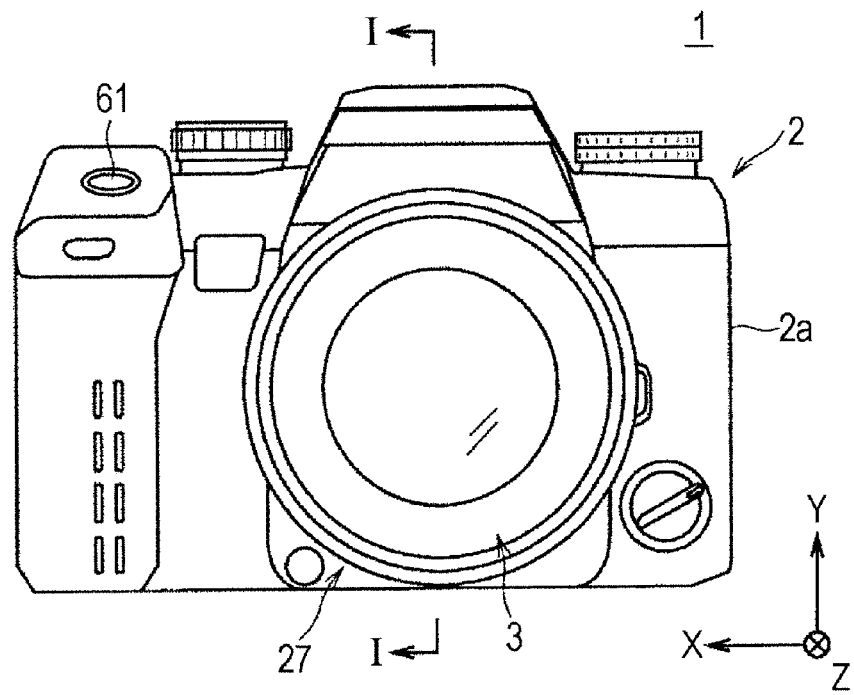
FIG. 1 is a front elevation of a digital camera according to a first embodiment.
Figure 2:
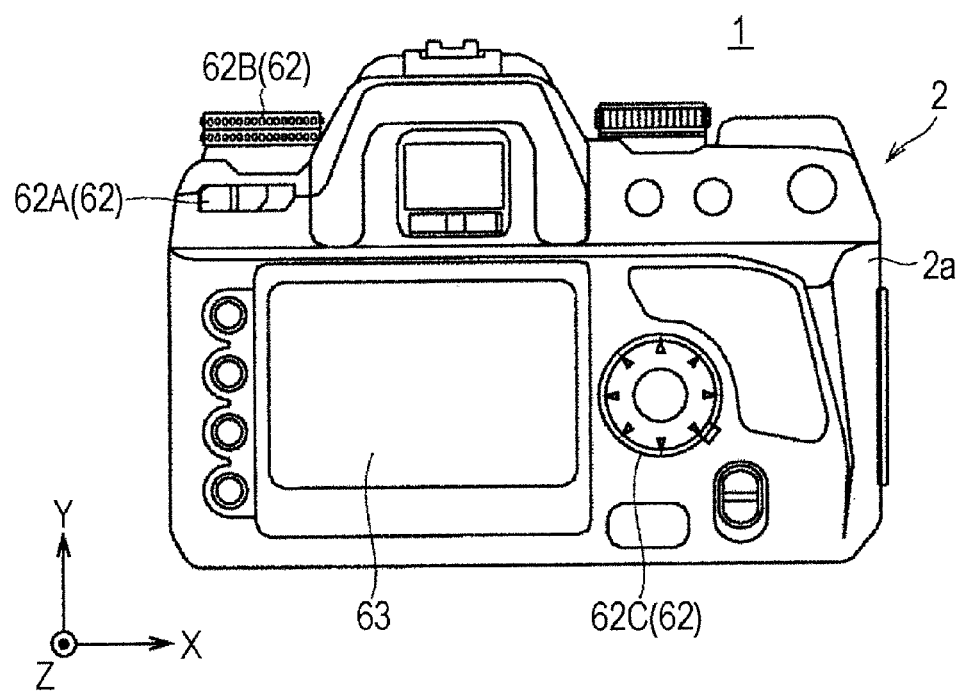
FIG. 2 is a rear elevation of the digital camera.
Figure 3:
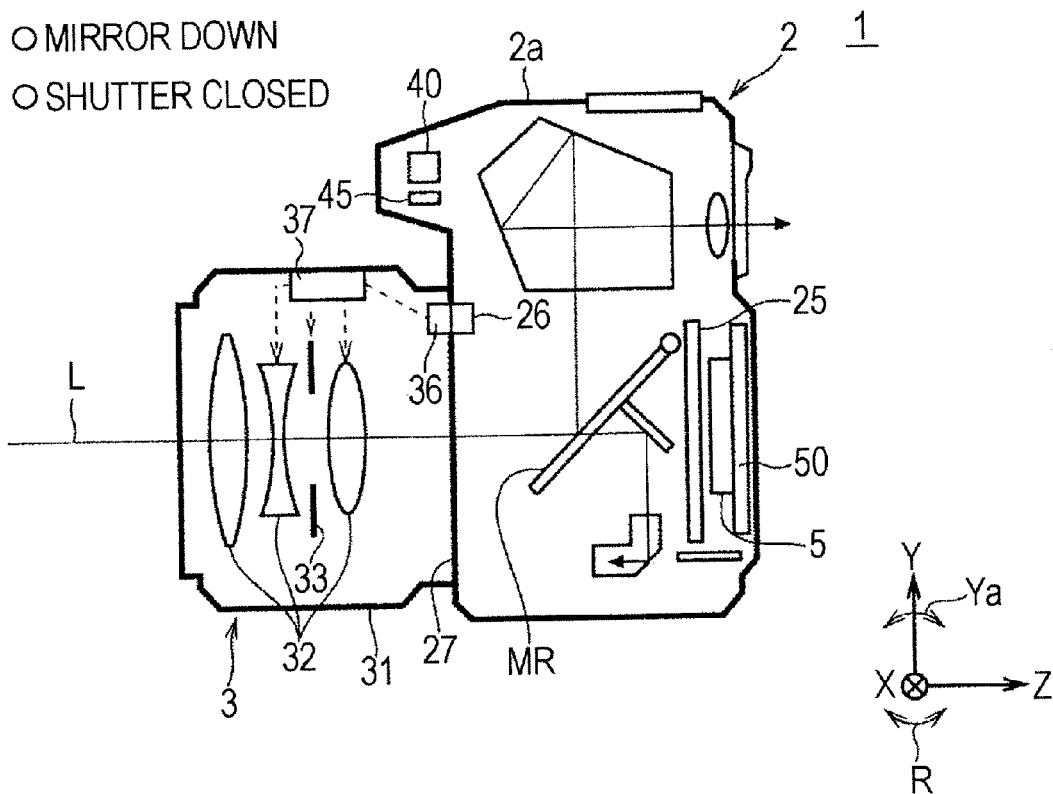
FIG. 3 is a cross-sectional view of the digital camera (mirror down state).
Figure 4:
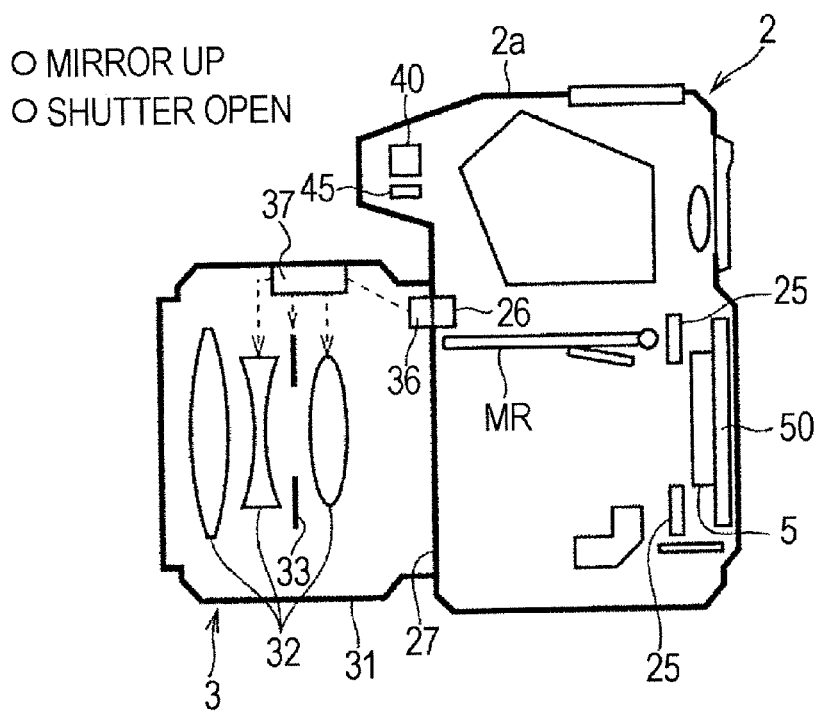
FIG. 4 is a cross-sectional view of the digital camera (mirror up state).

FIG. 1 is a front elevation of a digital camera 1 (also indicated at 1A), serving as an imaging apparatus, according to a first embodiment of the present invention. FIG. 2 is a rear elevation of the digital camera 1. FIGS. 3 and 4 are cross-sectional views (specifically, cross-sectional views taken along the line I-I of FIG. 1) of the digital camera 1. FIG. 3 shows a state in which a quick return mirror (hereinafter, also simply referred to as a mirror) MR is located in a lower position (mirror down state). FIG. 4 shows a state in which the mirror MR is located in an upper position (mirror up state).

The digital camera 1 has a blur correction function of correcting (suppressing) blurring of a subject image in an image caused by camera shake during shooting and a dust removal function of removing dust (contaminant), such as fine particles of a substance or dirt, deposited on an imaging device for image capture by vibration.

Referring to FIGS. 1 to 4, the digital camera 1 is a lens interchangeable imaging apparatus and includes a camera body 2. A lens mount 27 is arranged in the front of a housing 2a of the camera body 2. An interchangeable photographic lens 3 is detachably attached to the lens mount 27.

In the following description, the direction and orientation of the camera will be shown appropriately using X, Y, and Z of a three-dimensional rectangular coordinates system shown in FIG. 3 and the like. The Z axis (direction) extends along the optical axis L of the photographic lens 3. In addition, incident light travels in the positive Z direction (to the right in FIG. 3). The Y axis (direction) extends vertically. The positive Y direction is the vertically upward direction (upward direction in FIG. 3). Further, the X axis (direction) extends perpendicular to the drawing sheet of FIG. 3. The positive X direction is the downward direction perpendicular to the drawing sheet of FIG. 3. Those X, Y, and Z axes are fixed relative to the camera body 2 of the camera body 2.

Referring to FIG. 3, the photographic lens 3 primarily includes a barrel 31, a lens group 32 arranged in the barrel 31, and a diaphragm 33. The lens group 32 includes a focusing lens that is moved in the Z direction to change a focal position. An optical image formed on the X-Y plane (hereinafter, referred to as an "imaging plane") through the photographic lens 3 has a substantially circular shape whose center corresponds to the optical axis of the photographic lens 3 and is called an "image circle".

The photographic lens 3 further includes a communication connector 36 and a drive unit 37. When the photographic lens 3 is mounted to the camera body 2, the communication connector 36 of the photographic lens 3 is brought into contact with a communication connector 26 provided for the lens mount 27 of the camera body 2, so that the connectors are electrically connected. The contact between the communication connectors 36 and 26 permits the camera body 2 to detect attachment of the photographic lens 3 and also permits the camera body 2 and the photographic lens 3 to transmit and receive various signals therebetween. The drive unit 37 drives the lens group 32 and/or the diaphragm 33 in accordance with a signal transmitted from the camera body 2 through the communication connector 36.

In the housing 2a of the camera body 2, a shutter 25 and a CCD 5 are arranged along the optical axis L of the photographic lens 3 in that order from the side which light is incident on. The shutter 25 includes a focal plane shutter having an opening and closing mechanism and controls time of exposure of the CCD 5 to light. The CCD 5 is an imaging device having a plurality of fine pixels, each of which a color filter is arranged on. The CCD 5 photoelectrically converts an optical image (of a subject) formed through the photographic lens 3 into an image signal having, for example, RGB color components. Since the above-described imaging plane is adjusted so as to correspond to a light receiving surface of the CCD 5, part of an image circle is captured as an image by the CCD 5.

Figure 5:
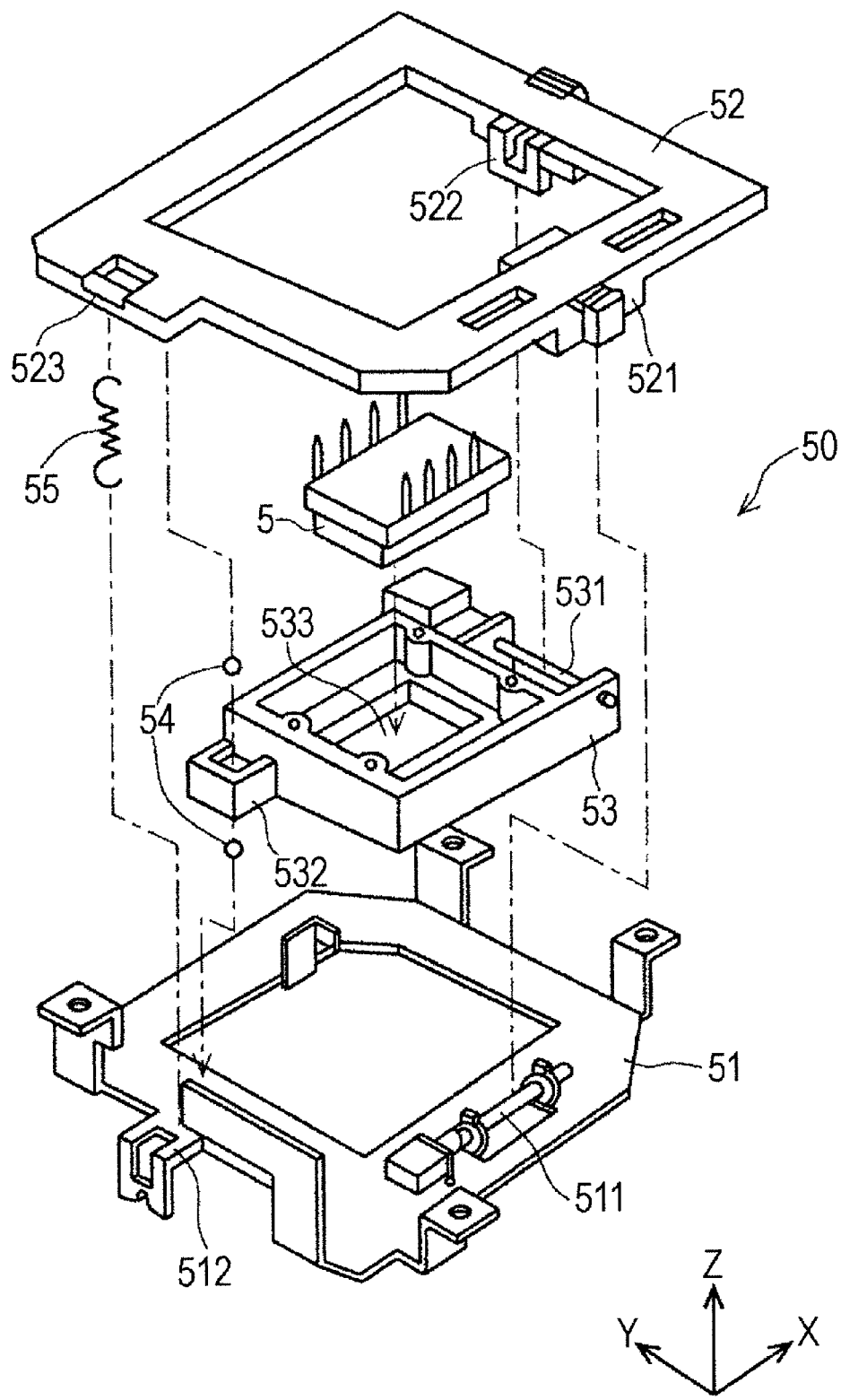
FIG. 5 is an exploded perspective view of a CCD moving unit including a CCD.

The CCD 5 is fixed to a CCD moving unit 50. The CCD 5 can be moved in the X-Y plane orthogonal to the Z axis by the CCD moving unit 50. FIG. 5 is an exploded perspective view of the CCD moving unit 50 including the CCD 5.

Referring to FIG. 5, the CCD moving unit 50 primarily includes three components, i.e., a base plate 51 fixed to the housing 2a, a first slider 52 that moves relative to the base plate 51 in the X direction, and a second slider 53 that moves relative to the first slider 52 in the Y direction.

The base plate 51 has an opening in a central portion so that light incident on the photographic lens 3 is allowed to pass therethrough and includes a first actuator 511 extending in the X direction and a first spring retainer 512 for retaining a spring 55. The second slider 53 has an opening 533, to which the CCD 5 can be fixed, in a central portion and includes a second actuator 531 extending in the Y direction and a ball receiver 532 for receiving rigid balls 54 in a first surface and a second surface arranged back-to-back in the Z direction such that the rigid balls are loosely fitted in the first and second surfaces, respectively. The first slider 52 has an opening in a central portion and includes a first frictional coupling part 521 opposed to the first actuator 511 and a second frictional coupling part 522 opposed to the second actuator 531. The first slider 52 further includes a second spring retainer 523 for retaining the spring 55, the second spring retainer 523 being opposed to the first spring retainer 512.

The first and second actuators 511 and 531 each include a piezoelectric element and a drive rod movable in the extending direction of the rod so that the drive rod moves in the direction according to a drive pulse applied to the piezoelectric element by a distance based on the drive pulse.

Upon assemble of the CCD moving unit 50, the CCD 5 is fitted into the opening 533 of the second slider 53 and is fixed thereto, the drive rod of the first actuator 511 is frictionally coupled to the first frictional coupling part 521, and the drive rod of the second actuator 531 is frictionally coupled to the second frictional coupling part 522. In addition, the spring 55 brings the base plate 51 and the first slider 52 toward each other. At that time, the second slider 53 is sandwiched between the base plate 51 and the first slider 52 such that each rigid ball 54 is disposed between the second slider 53 and the corresponding component. Consequently, the base plate 51, the second slider 53, and the first slider 52 are arranged such that those components 51, 53, and 52 overlie one another in that order from the negative Z direction to the positive Z direction.

In such a state where the CCD moving unit 50 is assembled, movement of the drive rod of the first actuator 511 causes movement of the first frictional coupling part 521 frictionally coupled to this drive rod, so that the first slider 52 is moved in the X direction relative to the base plate 51. At that time, the second slider 53 is also moved in the X direction relative to the base plate 51 in association with the movement of the first slider 52. Furthermore, movement of the drive rod of the second actuator 531 causes movement of the second frictional coupling part 522 frictionally coupled to this drive rod, so that the second slider 53 is moved in the Y direction relative to the first slider 52. At that time, since the first slider 52 is not moved relative to the base plate 51, the second slider 53 alone is moved in the Y direction relative to the base plate 51.

Since the base plate 51 is fixed to the housing 2a and the CCD 5 is fixed to the second slider 53 as described above, the CCD 5 is moved within the X-Y plane (imaging plane) relative to the housing 2a. In addition, since the photographic lens 3 is attached to the housing 2a and is fixed thereto, the position of an image circle formed through the photographic lens 3 is fixed relative to the housing 2a. With the above-described structure of the CCD moving unit 50, therefore, the CCD 5 is moved relative to an image circle (optical image) formed through the photographic lens 3, so that an area obtained as an image in the image circle is changed.

A CCD position sensor 58 (not shown in FIG. 5; refer to FIG. 6) for detecting the position of the CCD 5 which is moved is arranged above the CCD 5 in the positive Z direction. The CCD position sensor 58 includes, for example, a light emitting and receiving type position sensor. The position of the CCD 5 is obtained as a position represented by XY coordinates on the basis of a change in position of light received by a light receiving part of the sensor.

Again referring to FIG. 3, a vibration sensor 40 for detecting vibration caused by shake of the digital camera 1 is arranged in the housing 2a of the camera body 2. The vibration sensor 40 includes two angular velocity sensors and detects an angular velocity of rotational vibration (pitching) Pi about the X axis and an angular velocity of rotational vibration (yawing) Ya about the Y axis using the two angular velocity sensors. On the basis of the two angular velocities detected by the vibration sensor 40, the CCD 5 is moved along the X axis and the Y axis, respectively, thus correcting blurring of a subject image in an image, i.e., performing blur correction.

A posture sensor 45 for detecting the posture of the digital camera 1 is arranged in the housing 2a. The posture sensor 45 detects whether the digital camera 1 has any of various posture states, e.g., an upward posture, a downward posture (refer to FIG. 9), or a normal posture (standard posture) (refer to (a) of FIG. 11 and (a) of FIG. 12). As the posture sensor 45, various sensors, such as a sensor using gravitational acceleration, can be used. The posture sensor 45 can detect the angle of posture about the X axis and that about the Z axis. In this embodiment, the vibration sensor 40 and the posture sensor 45 are separately arranged. A sensor having functions of both the sensors 40 and 45 may be disposed.

Again referring to FIG. 1, a shutter release 61 is arranged in an upper portion of the camera body 2. The shutter release 61 serves as a button through which an instruction to start preparation for shooting or imaging (start exposure) is received from a user. The shutter release 61 functions as a two-step switch capable of detecting a halfway pressed state (also referred to as a state S1) and a fully pressed state (also referred to as a state S2).

Referring to FIG. 2, operation units 62 for receiving various user operations and a display unit 63 for displaying various pieces of information and images are arranged on the rear of the camera body 2. The operation units 62 include a power switch 62A for turn on/off, a mode switch 62B for receiving an instruction to switch the operation mode of the digital camera 1, and a select key 62C for receiving an instruction to select the direction, such as upward, downward, right, or left, or an instruction to determine a selected item.

The operation modes of the digital camera 1 according to the present embodiment include a "shooting mode" for capturing an image of a subject and recording the image, a "playback mode" for playing (displaying) a recorded image, and a "dust removal mode" for removing dust deposited on the CCD 5. In the "dust removal mode" different from the "shooting mode", the CCD moving unit 50 can move the CCD 5. In other words, in the "dust removal mode", the CCD 5 is vibrated by the CCD moving unit 50, so that dust deposited on the CCD 5 is removed (the details will be described below). Strictly speaking, in the present embodiment, dust is not directly deposited on an imaging surface of the CCD 5. Dust is deposited on a low-pass filter (not shown) incorporated in the imaging surface of the CCD 5 (imaging device). In the present application, such a deposition state is regarded as "deposition of dust on the imaging device".

The display unit 63 includes a liquid crystal display capable of color display. During standby in the "shooting mode", images captured at minimal time intervals are sequentially displayed in the display unit 63 (live view display). The user can confirm the real-time state of a subject using live view display for moving images on the display unit 63 and use the display unit 63 instead of a finder. In the "playback mode", a recorded image is played, i.e., displayed on the display unit 63.

A memory card 91 (refer to FIG. 6) for recording various data blocks can be inserted into the camera body 2. In the "shooting mode", an image captured through the CCD 5 is recorded onto the memory card 91.

Figure 6:
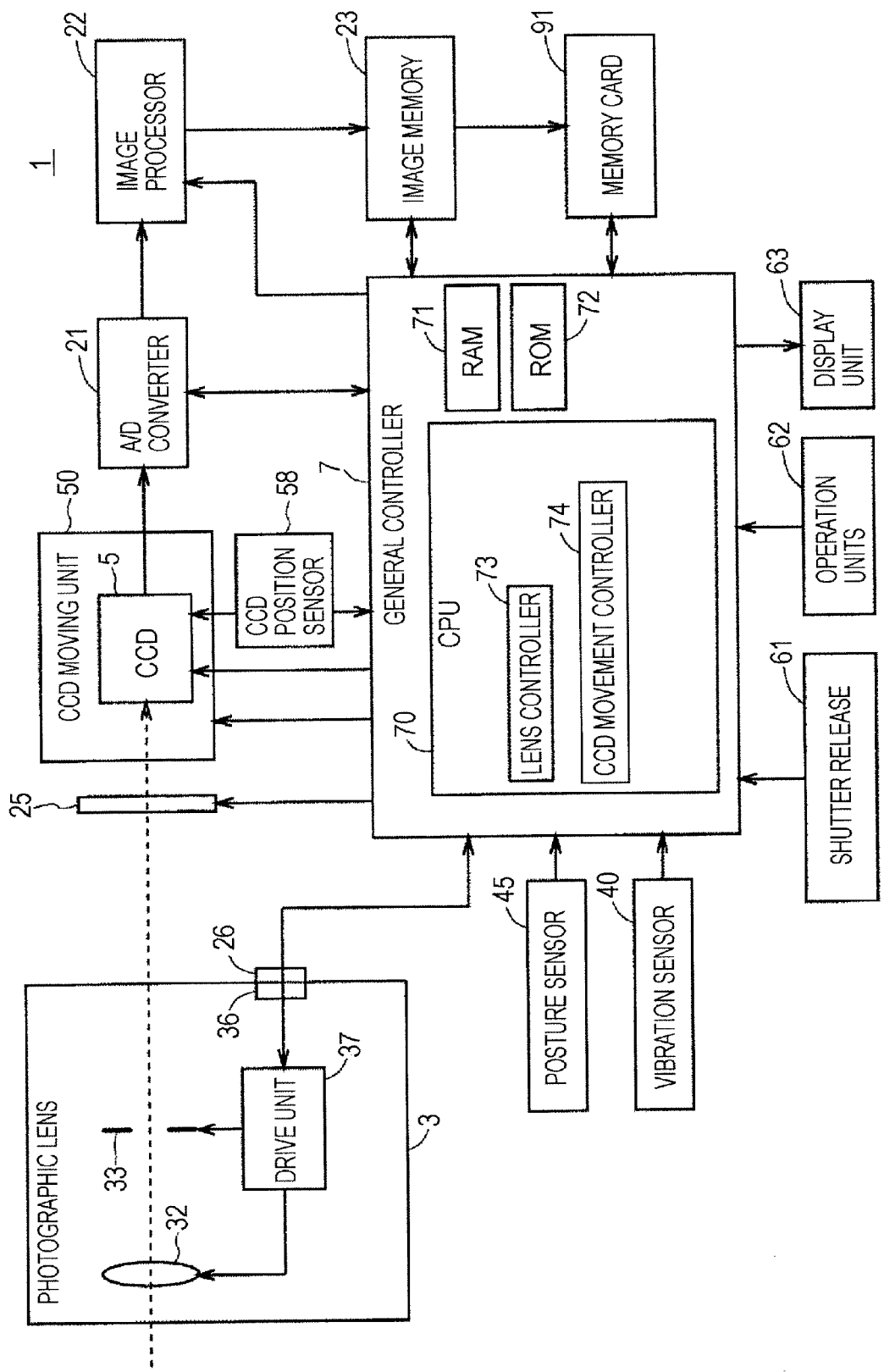
FIG. 6 is a diagram showing major components of the digital camera as functional blocks.

Various functions, such as the blur correction function and the dust removal function, of the digital camera 1 are performed under the control of a general controller 7 disposed within the housing 2a of the camera body 2. FIG. 6 illustrates major components of the digital camera 1, including the general controller 7, as functional blocks.

Referring to FIG. 6, the above-described respective components, such as the shutter 25, the CCD 5, the CCD moving unit 50, the CCD position sensor 58, the vibration sensor 40, the shutter release 61, the operation units 62, and the display unit 63, of the digital camera 1 are electrically connected to the general controller 7 so that the components operate under the control of the general controller 7. In addition, the position of the CCD 5 detected by the CCD position sensor 58, the angular velocities detected by the vibration sensor 40, an operation on the shutter release 61, and operations on the operation units 62 are supplied as signals to the general controller 7. The general controller 7 is also electrically connected to the communication connector 26. Therefore, the general controller 7 can detect attachment and detachment of the photographic lens 3 and transmit various signals to the drive unit 37 of the photographic lens 3 through the communication connectors 26 and 36.

In FIG. 6, an A/D converter 21, an image processor 22, and an image memory 23 each serve as a processing unit for handling an image captured through the CCD 5. In other words, the A/D converter 21 converts an image, serving as an analog signal, captured through the CCD 5 into a digital signal, the image processor 22 performs predetermined image processing on the digital signal, and the image memory 23 stores the resultant signal. The image stored in the image memory 23 is recorded as a recording image onto the memory card 91 or is displayed as an image for live view display on the display unit 63. Various processes on an image are performed under the control of the general controller 7.

The general controller 7 includes a microcomputer. In other words, the general controller 7 includes a CPU 70 for performing various arithmetic operations, a RAM 71 serving as a working area for the arithmetic operations, and a ROM 72 for storage of a control program and performs overall control on the operations of the above-described respective components of the digital camera 1.

The CPU 70 performs arithmetic processing in accordance with the control program stored in the ROM 72 to realize various functions of the general controller 7. The control program is previously stored in the ROM 72. A new control program may be read from the memory card 91 and be stored into the ROM 72.

Functions of the general controller 7 realized by arithmetic processing through the CPU 70 based on the control program include various functions, e.g., a function of controlling the operations of the above-described respective components of the digital camera 1, an exposure control function of controlling an f number (corresponding to the diameter of an aperture of the diaphragm 33) and exposure time (corresponding to shutter speed) to optimize the brightness of an image, and an auto focus function of controlling the focal position to focus on a subject.

A lens controller 73 and a CCD movement controller 74 in FIG. 6 schematically illustrate parts of the above-described functions of the general controller 7.

The lens controller 73 transmits a signal to the drive unit 37 of the photographic lens 3 to control movement of the lens group 32 in the photographic lens 3 and that of the diaphragm 33. The lens controller 73 monitors attachment and detachment of the photographic lens 3 on the basis of a signal supplied from the communication connector 26.

The CCD movement controller 74 performs control related to movement of the CCD 5 by the CCD moving unit 50. To move the CCD 5, the CCD movement controller 74 outputs a drive pulse to the CCD moving unit 50. Control by the CCD movement controller 74 realizes both of the blur correction function and the dust removal function. In other words, driving means for dust removal also functions as means for reducing camera shake. Accordingly, the digital camera 1 can be miniaturized.

<1-2. Operation in Dust Removal Mode>

Figure 7:
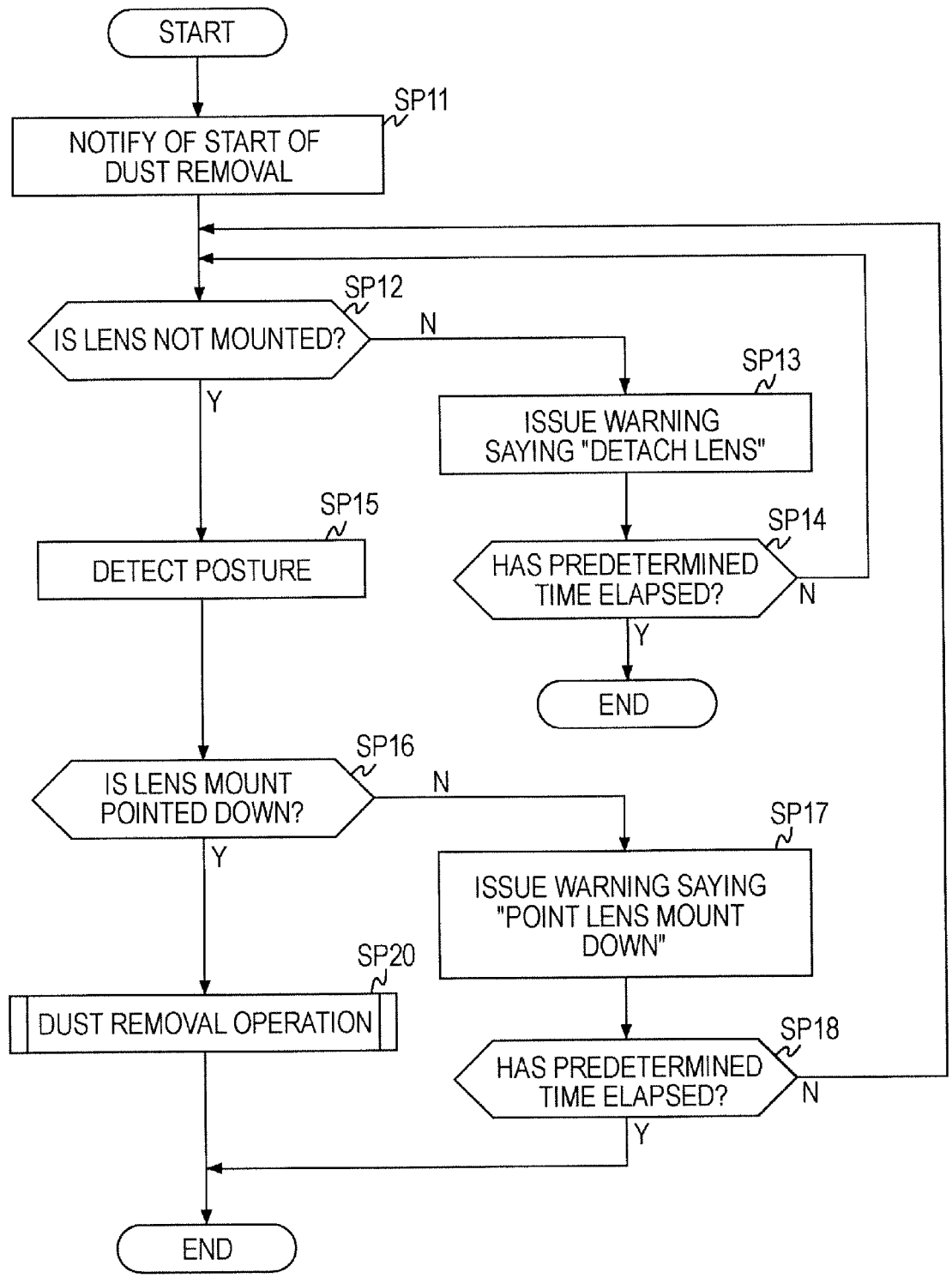
FIG. 7 is a flowchart showing the operation in a dust removal mode according to the first embodiment.
Figure 8:
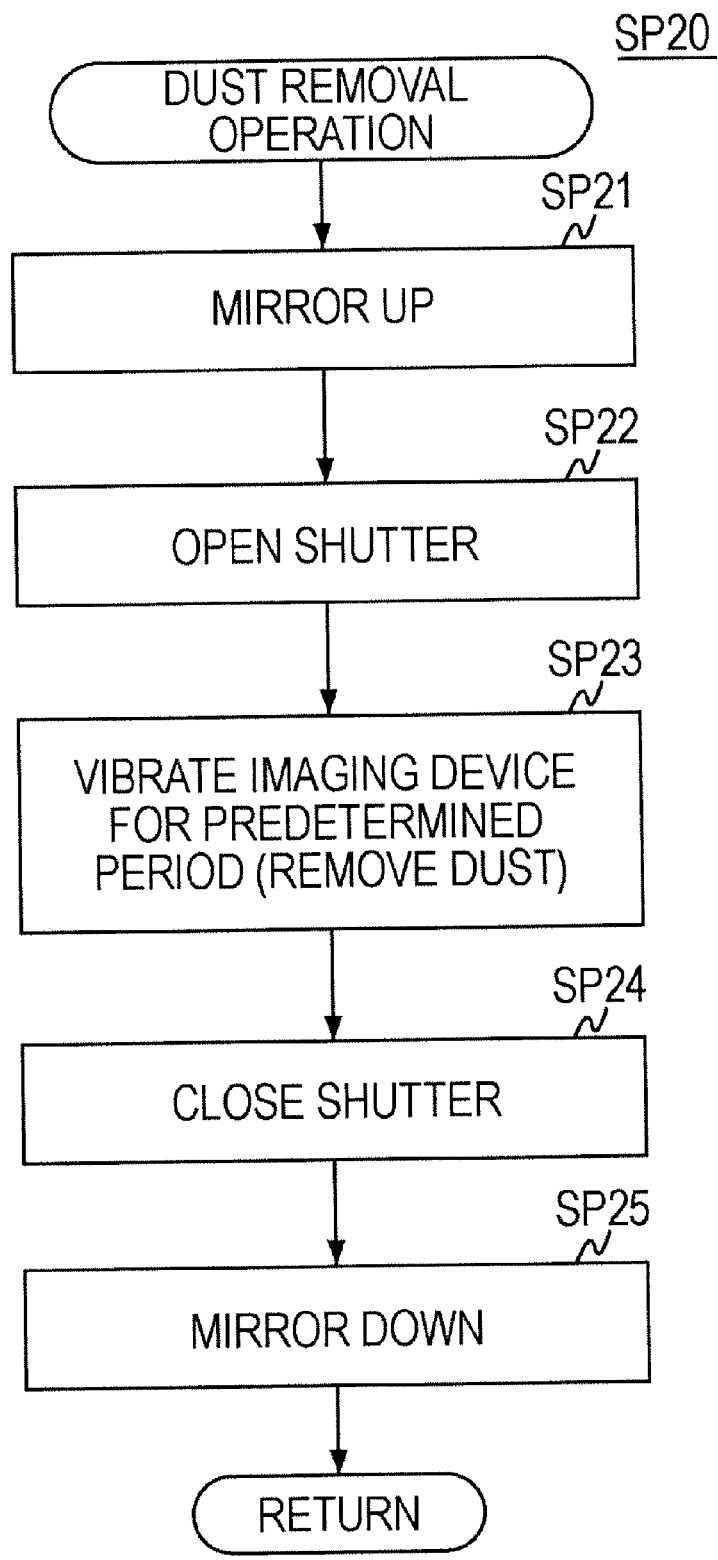
FIG. 8 is a flowchart showing a dust removal operation.
Figure 9:
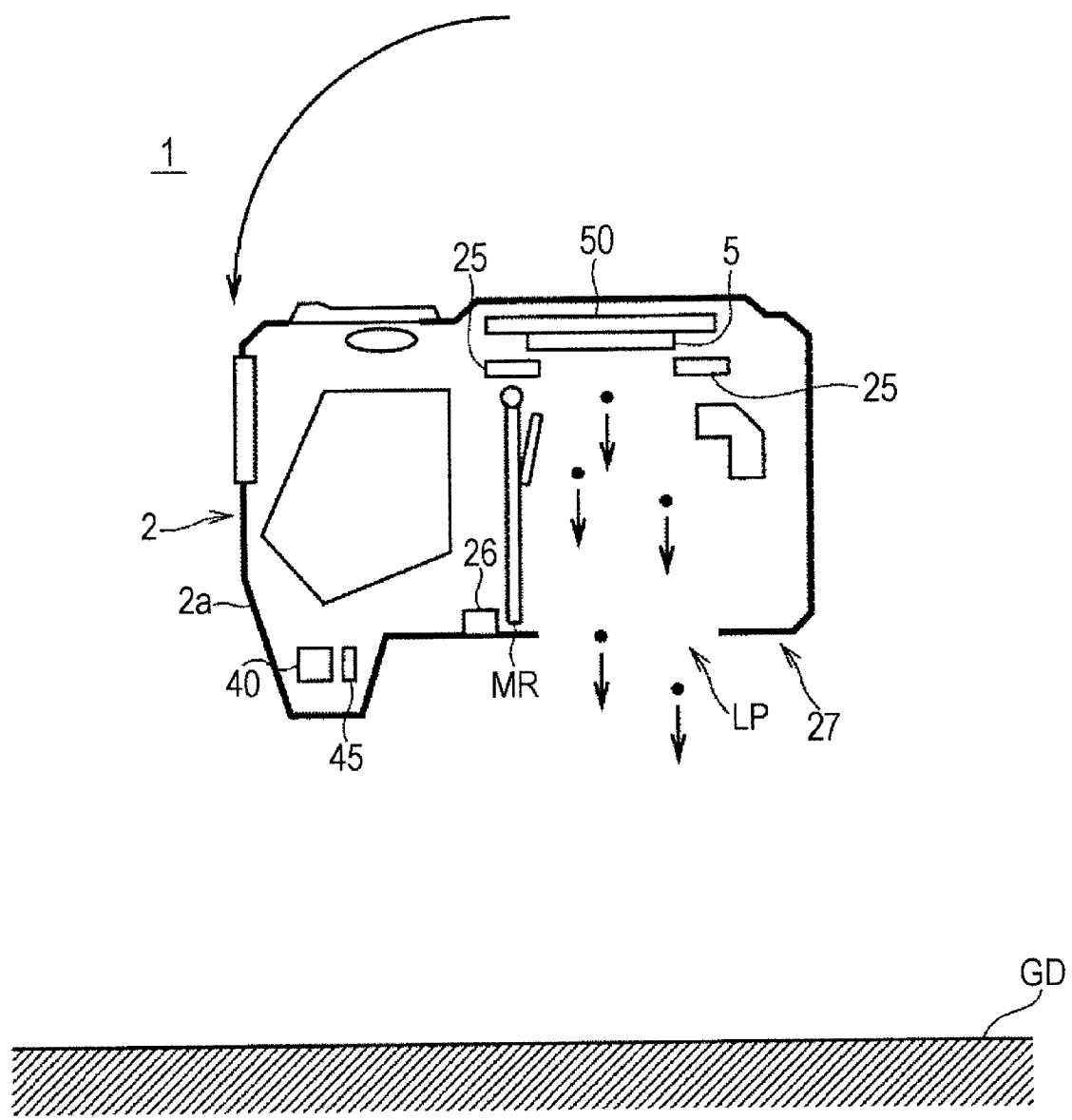
FIG. 9 is a diagram illustrating a state in which a lens mount is pointed down to remove dust.

The operation in the "dust removal mode" of the digital camera 1 will now be described with reference to FIGS. 7 through 9. FIG. 7 is a flowchart schematically describing the operation in the "dust removal mode" of the digital camera 1. FIG. 8 is a flowchart describing part of the operation. FIG. 9 illustrates a state where the lens mount 27 is pointed down to remove dust. In the state shown in FIG. 9, the lens mount 27 is arranged in substantially parallel to ground GD and is located below the CCD 5.

In the dust removal mode, the CCD 5 is vibrated to remove contaminant (dust) on the CCD 5 so long as it is determined that the photographic lens is not mounted and the digital camera 1 has a downward posture (i.e., the lens mount 27 is pointed down, alternatively, a lens mounting opening LP (refer to FIG. 9) is pointed down). Referring to FIG. 9, the lens mounting opening LP is a substantially circular opening surrounded by the lens mount 27 in the front of the camera body 2. The lens mounting opening LP is visually observed when the photographic lens 3 is detached from the camera body 2.

Referring to FIG. 7, when the digital camera 1 is set in the "dust removal mode", the user is notified of information indicating the start of dust removal (step SP11). Specifically, the display unit 63 displays a message saying "Cleaning starts".

Only when it is determined that the photographic lens is not mounted and the lens mount 27 of the digital camera 1 is pointed down, the operation proceeds to step SP20 and the dust removal operation is performed.

Specifically, in step SP12, whether attachment of the photographic lens 3 is released is determined.

When it is determined that the photographic lens 3 is still mounted on the camera body 2, a warning is given to the user (step SP13). Specifically, the display unit 63 further displays a message saying "Detach the lens". It is determined whether predetermined time (for example, three minutes) T1 has elapsed since the start of the dust removal mode (step SP14). If time T1 has not elapsed, the operation is returned to step SP12 and display of the warning is continued until the lens is detached. If the lens is not detached after a lapse of the predetermined time T1, this routine terminates.

On the other hand, when the photographic lens 3 is detached from the camera body 2 and it is determined that the photographic lens 3 is not mounted, the posture sensor 45 detects the posture of the digital camera 1 (step SP15). A process for the detected posture is performed.

Specifically, when it is determined in step SP16 that the lens mount 27 of the camera body 2 is pointed down, the operation proceeds to step SP20. If it is determined in step SP16 that the lens mount 27 is not pointed down, the display unit 63 displays a message saying "Point the lens mount down" to give a warning to the user (step SP17). After that, it is determined whether the time T1 has elapsed since the start of the dust removal mode (step SP18). If the time T1 has not elapsed, the operation is returned to step SP12 and the warning is continuously displayed until the lens mount 27 is pointed down. When it is determined that the time T1 has elapsed, this routine terminates. In other words, if it is determined that the lens mount 27 is not pointed down after the time T1 has elapsed since the start of the dust removal mode, this routine terminates.

Consequently, when the photographic lens 3 is not mounted and the lens mount 27 is pointed down within the time T1 elapsed since the start of the dust removal mode, the dust removal operation (step SP20) is performed.

FIG. 8 is a flowchart showing the details of the dust removal operation (step S20).

Referring to FIG. 8, in step SP20, the mirror MR is moved to the upper position (mirror up) (step SP21), the shutter 25 is opened (step SP22), and the CCD movement controller 74 continuously transmits drive pulses to the actuators 511 and 531 of the CCD moving unit 50, so that the CCD 5 is vibrated for time (period) T2 (e.g., 30 seconds) (step SP23). Consequently, dust deposited on the surface of the CCD 5 is removed therefrom. The dust removed from the CCD 5 falls down while passing through the opened shutter 25 and the lens mounting opening LP as shown in FIG. 9, so that the dust is discharged from the camera body 2. Accordingly, dust is prevented from remaining in the camera body 2, thus preventing redeposition of dust on the CCD 5.

After the shutter 25 is closed (step SP24), the mirror MR is moved to the lower position (mirror down) (step SP25). Thus, the dust removal operation is finished.

As described above, in the digital camera 1 according to the first embodiment, when it is determined that the photographic lens 3 is not mounted and the lens mount 27 (lens mounting opening LP) is pointed down, the CCD 5 is vibrated. Consequently, dust removed from the CCD 5 can be more reliably discharged from the digital camera 1. Therefore, redeposition of dust on the CCD 5 can be prevented, thus allowing for efficient dust removal. In addition, since the dust removal operation is performed while the lens mounting opening LP is pointed down, dust newly coming from above of the digital camera 1 during the dust removal operation can be prevented from entering the camera body 2.

2. Second Embodiment

The above-described first embodiment has described the case where when it is determined in the dust removal mode that the photographic lens is not mounted and the digital camera 1 (more specifically, the lens mount 27 or the lens mounting opening LP) is pointed down, the CCD 5 is vibrated to remove contaminant thereon. A second embodiment will exemplify a case where when it is determined in the dust removal mode that the digital camera 1 has a "normal posture" (which will be described below), the CCD 5 is vibrated to remove contaminant thereon.

A digital camera 1 (1B) according to the second embodiment is a modification of the digital camera 1 (1A) according to the first embodiment. The difference therebetween will be mainly described below.

Figure 10:
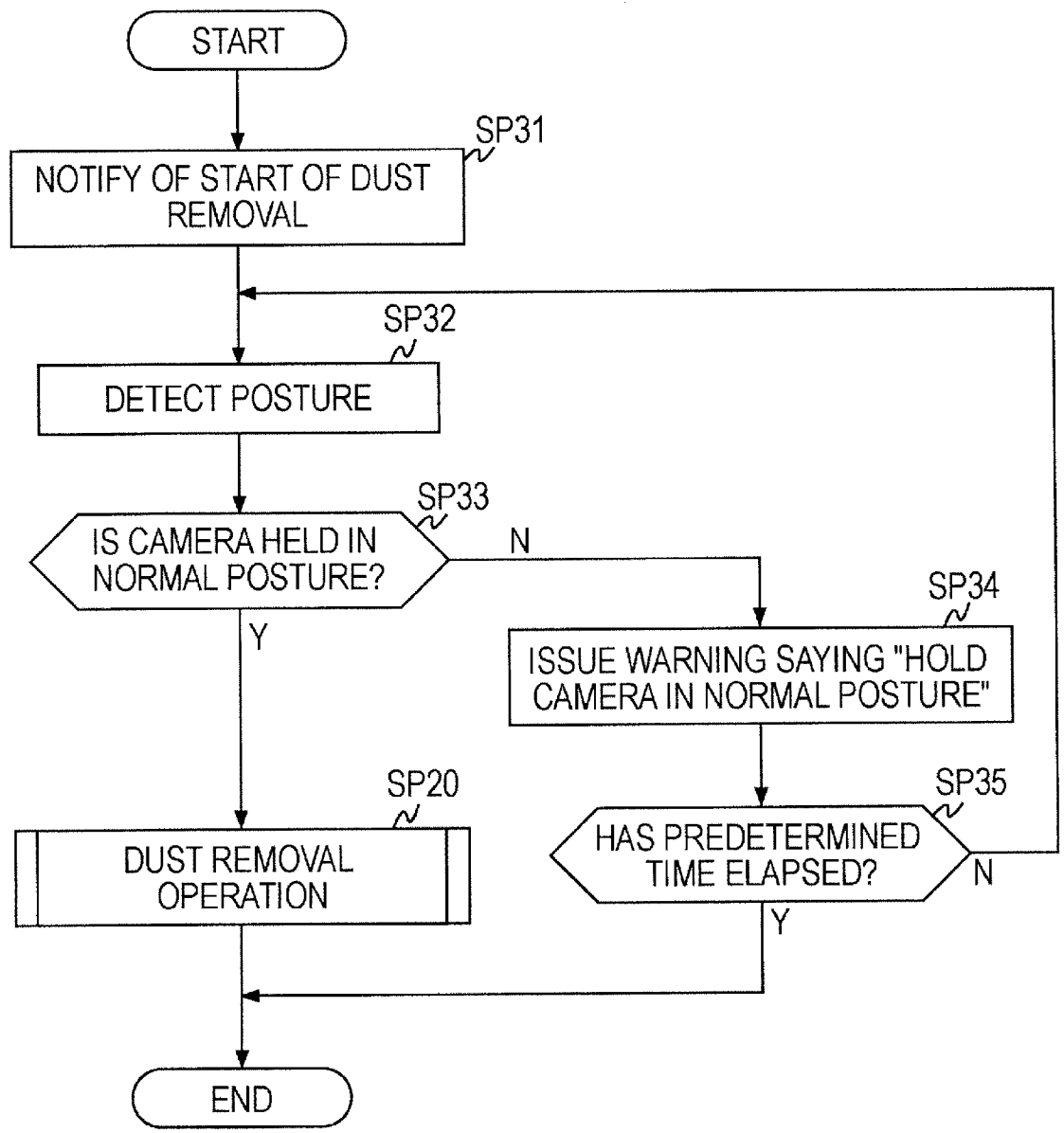
FIG. 10 is a flowchart showing the operation in the dust removal mode according to a second embodiment.
Figure 11:
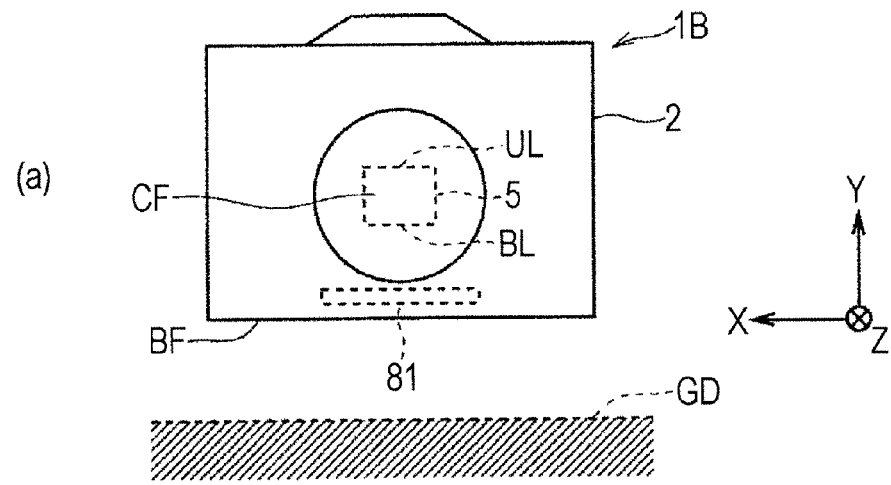
FIG. 11 includes diagrams showing various postures of a digital camera viewed from the front.
Figure 11:
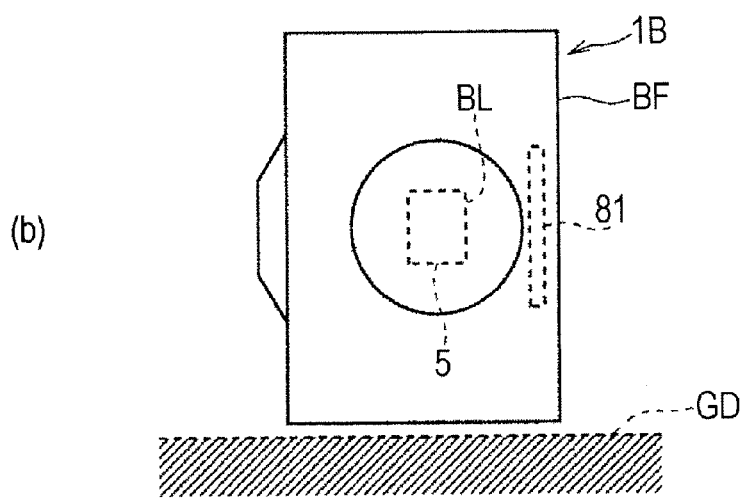
Figure 11:
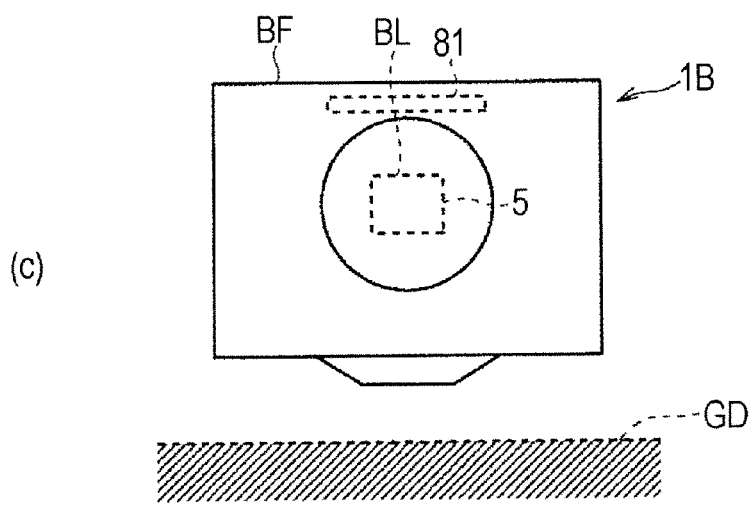
Figure 12:
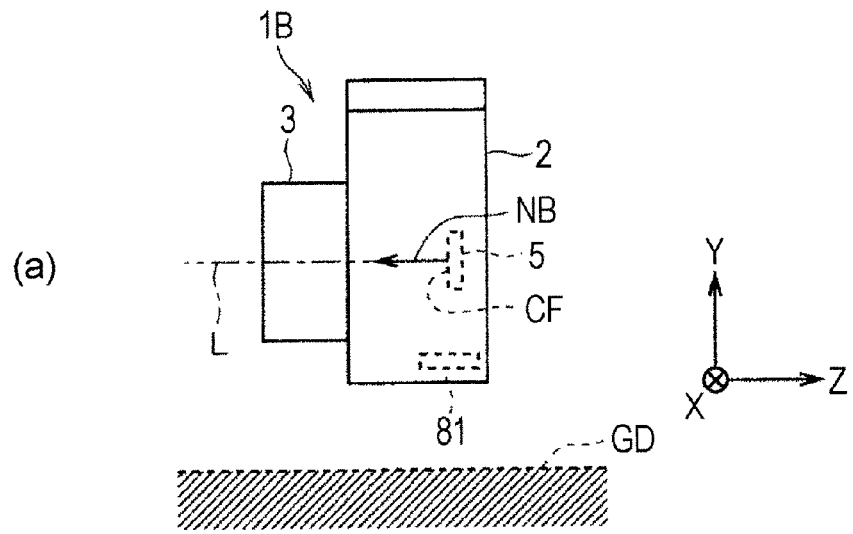
FIG. 12 includes diagrams showing various postures of a digital camera viewed from either side.
Figure 12:
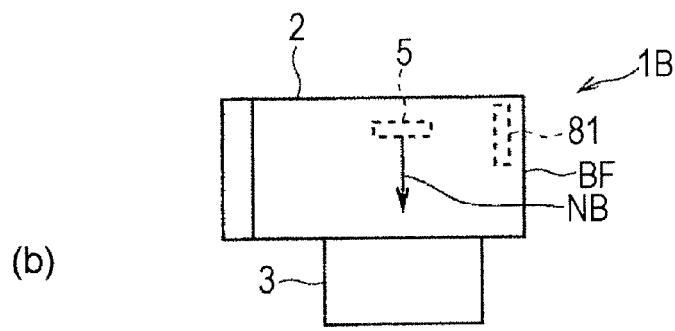
Figure 12:
Figure 12:
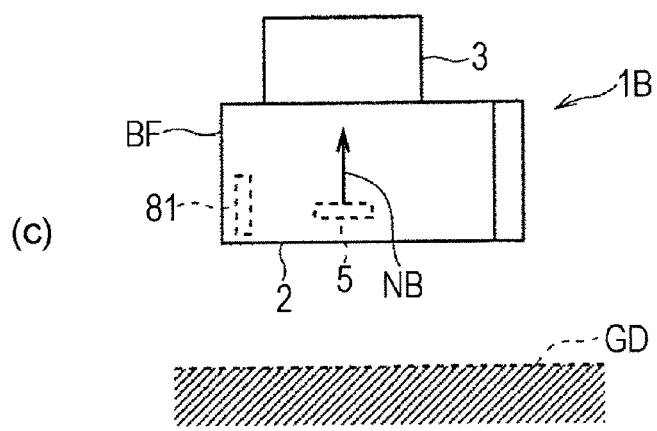

FIG. 10 is a flowchart showing the operation in a dust removal mode in accordance with the second embodiment. FIGS. 11 and 12 are diagrams explaining the "normal posture". FIG. 11 includes diagrams illustrating various postures of the digital camera 1B viewed from the front. FIG. 12 includes diagram showing various postures of the digital camera 1B viewed from either side.

(a) of FIG. 11 and (a) of FIG. 12 each show the digital camera 1 with the normal posture. Referring to (a) of FIG. 11 and (a) of FIG. 12, a bottom surface BF of a camera body 2 of the digital camera 1 is held in substantially parallel to ground GD. Specifically, a lower edge UL of an imaging surface (having a substantially rectangular shape) CF of a CCD 5 is lower than an upper edge UL thereof and is arranged in substantially parallel to the ground GD (refer to (a) of FIG. 11) and a normal vector NB extending from the imaging surface CF of the CCD 5 is substantially parallel to the ground GD (refer to (a) of FIG. 12). In other words, the posture shown in (a) of FIG. 11 and (a) of FIG. 12 corresponds to a posture obtained when the optical axis L of a photographic lens 3 is held in substantially parallel to the ground GD in order to take a normal landscape picture.

Since this posture is a standard posture of the digital camera 1 used during shooting, it can also be called a "standard posture" or a "normal posture".

On the other hand, (b) and (c) of FIG. 11 illustrate postures other than the normal posture. (b) of FIG. 11 shows a posture obtained by rotating the digital camera 1B with the posture shown in (a) of FIG. 11 about the Z axis by 90° (deg). (c) of FIG. 11 shows a posture obtained by rotating the digital camera 1B with the posture shown in (a) of FIG. 11 about the Z axis by 180° (deg). The posture shown in (b) of FIG. 11 will also be called a portrait posture (longitudinally reversed posture). The posture shown in (c) of FIG. 11 will also be called an inverted posture.

(b) and (c) of FIG. 12 illustrate postures other than the normal posture. (b) of FIG. 12 shows a posture obtained by rotating the digital camera 1B with the posture shown in (a) of FIG. 12 about the X axis by 90° (deg). (c) of FIG. 12 shows a posture obtained by rotating the digital camera 1B with the posture shown in (a) of FIG. 12 about the X axis by −90° (deg). The posture shown in (b) of FIG. 12 will also be called a downward posture and the posture shown in (c) of FIG. 12 will also be called an upward posture.

The digital camera 1B according to the second embodiment includes a dust absorbing member 81 located vertically below the CCD 5 in the camera body 2 as shown in (a) of FIG. 11 and (a) of FIG. 12. The dust absorbing member 81 has an adhesive film on the upper surface thereof and is capable of absorbing dust falling from above.

When the digital camera 1B has the normal posture, most of dust removed from the CCD 5 falls on the dust absorbing member 81 arranged vertically below the CCD 5, so that the dust is absorbed by the dust absorbing member 81. Consequently, the dust removed from the CCD 5 can be prevented from being deposited on another part in the camera body 2. Therefore, dust on the other part can be prevented from being again deposited on the CCD 5 later.

On the other hand, when the digital camera 1B has a "non-normal posture (that is not the normal posture)", dust removed from the CCD 5 does not fall toward the dust absorbing member 81 and is often deposited on another part in the camera body 2. In this case, the dust on the other part may be again deposited on the CCD 5 later. Accordingly, in the second embodiment, when the digital camera 1B has the "non-normal posture", the dust removal operation for removing contaminant by vibrating the CCD 5 is not performed.

The "normal posture (also referred to as the standard posture)" is not limited to that shown in (a) of FIG. 11 and (a) of FIG. 12. A posture obtained by rotating the posture shown in (a) of FIG. 11 about the Z axis by an allowable rotation angle (in the range of, e.g., several degrees (deg) to several tens of degrees (deg)) and a posture obtained by rotating the posture shown in (a) of FIG. 12 about the X axis by that allowable rotation angle may be used. The "non-normal postures (also referred to as non-standard postures)" are not limited to those shown in (b) and (c) of FIG. 11 and (b) and (c) of FIG. 12 and may include postures different from the normal postures.

The operation in the dust removal mode of the digital camera 1B according to the second embodiment will now be described with reference to FIG. 10.

When the digital camera 1B is set in the "dust removal mode", the user is notified of information indicating the start of dust removal (step SP31). A posture sensor 45 detects the posture of the digital camera 1B (step SP32).

A process for the detected posture is performed. Specifically, whether the digital camera 1B is held in the "normal posture" is determined (step SP33).

When it is determined in step SP33 that the digital camera 1B is held in the normal posture, the operation proceeds to step SP20. On the other hand, when it is determined that the digital camera 1B is not held in the normal posture, a warning is issued, i.e., a message saying "Hold the camera in normal posture" is displayed in a display unit 63 (step SP34). Whether predetermined time T1 has elapsed since the start of a dust mode is determined (step SP35). When it is determined that the time T1 has not elapsed, the operation is returned to step SP32 and the posture is again detected. On the other hand, when it is determined in step SP35 that the time T1 has elapsed, this routine terminates. In other words, when it is determined that the digital camera 1B is not held in the normal posture after a lapse of the time T1 since the start of the dust mode, this routine terminates.

As described above, when the digital camera 1B is held in the normal posture within the time T1 elapsed since the start of the dust mode, the above-described dust removal operation (step SP20) is performed.

As described above, in the digital camera 1B according to the second embodiment, when the digital camera 1B is held in the normal posture, the CCD 5 is vibrated to remove dust from the CCD 5. So long as the digital camera 1B is held in the normal posture, most of dust removed from the CCD 5 falls toward the dust absorbing member 81 arranged vertically below the CCD 5, so that the dust is absorbed by the dust absorbing member 81. Accordingly, dust removed from the imaging device can be more reliably absorbed. Consequently, dust removed from the CCD 5 can be prevented from being deposited on another part in the camera body 2, therefore, the dust on the other part can be prevented from being again deposited on the CCD 5 later. In addition, since the dust removal operation is performed while the digital camera 1 is held in the normal posture as a standard posture, ease of use can be achieved.

3. Third Embodiment

The foregoing first and second embodiments have described the case where the CCD 5 is vibrated in the "dust removal mode" to remove contaminant thereon. A third embodiment will exemplify a case where the CCD 5 is vibrated in the "shooting mode" to remove contaminant thereon.

A digital camera 1 (1C) according to the third embodiment is a modification of the digital camera 1 (1B) according to the second embodiment. The difference therebetween will now be mainly described.

Figure 13:
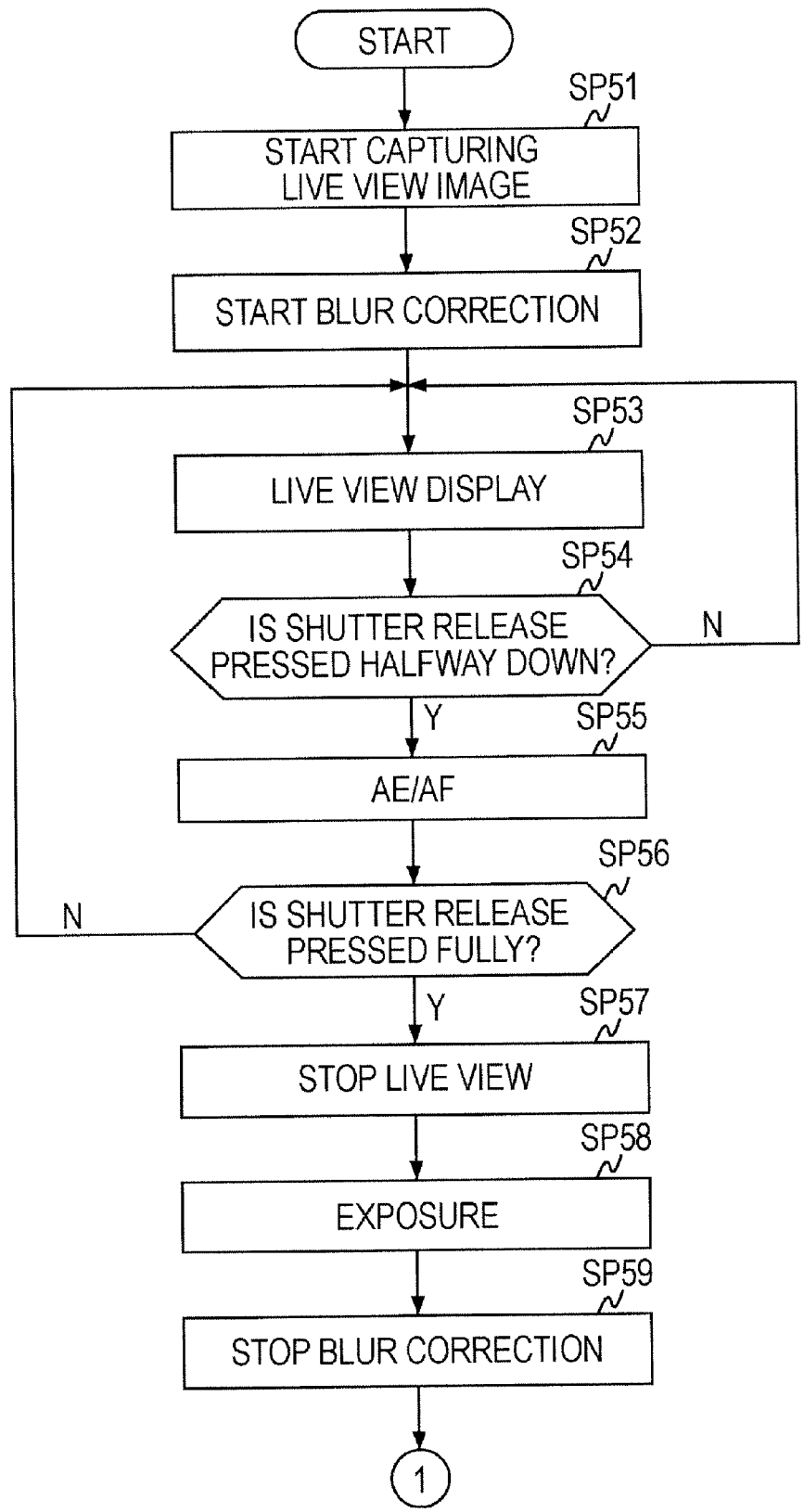
FIG. 13 is a flowchart showing the operation according to a third embodiment.
Figure 14:
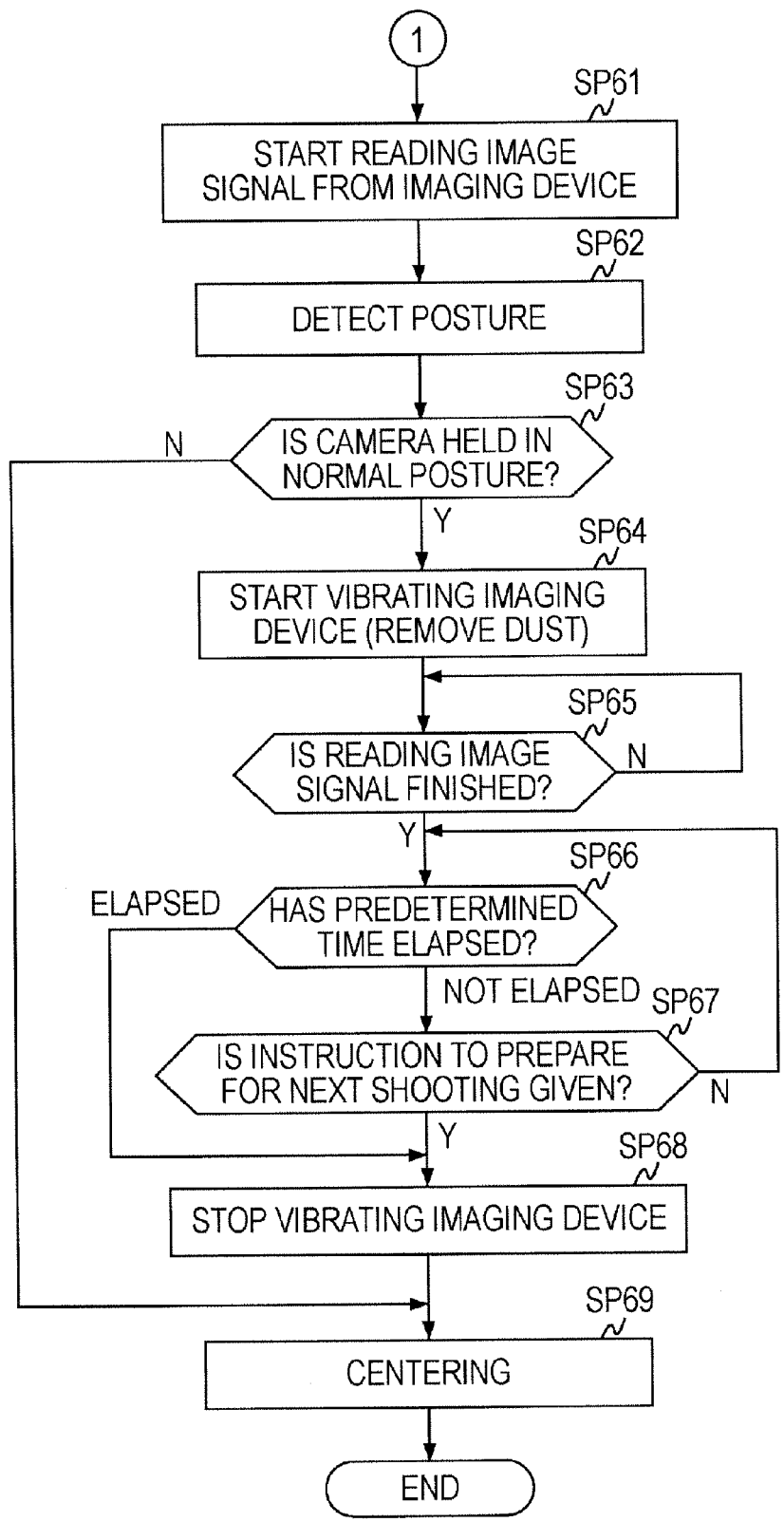
FIG. 14 is a flowchart showing the operation according to the third embodiment.

FIGS. 13 and 14 show a flowchart showing the operation in a "shooting mode" of the digital camera 1C according to the third embodiment. The operation in the "shooting mode" will now be described with reference to FIGS. 13 and 14.

When the digital camera 1C is set to the "shooting mode", the digital camera 1C is switched into a shooting standby state for an operation on a shutter release 61. Specifically, capturing a live view image is started (step SP51) and blur correction is started (step SP52). A display unit 63 performs live view display (step SP53). In other words, images captured through a CCD 5 at predetermined time intervals are subjected to predetermined processes by an A/D converter 21 and an image processor 22 and are then sequentially displayed on the display unit 63.

When it is determined in step SP54 that the shutter release 61 is pressed halfway down, a general controller 7 performs exposure control (AE) and focus control (AF) to determine an f number and exposure time and control a focal position of a lens group 32 (step SP55).

Subsequently, the operation proceeds to a standby state for fully pressing of the shutter release 61. If the shutter release 61 is continuously pressed halfway down, live view display is performed during that time (step SP53). If the depression of the shutter release 61 is cancelled, the digital camera is returned to the shooting standby state.

On the other hand, if it is determined in step SP56 that the shutter release 61 is pressed fully, the operation of capturing a live view image and the display operation are stopped (step SP57). Exposure for shooting of an image is performed on the CCD 5 (step SP58). Specifically, after the mirror up operation is performed, the exposure operation is performed for predetermined exposure time while a shutter 25 is opened and is closed and the mirror down operation is then performed. Consequently, an image signal related to an image of a subject is charged by the CCD 5. During the exposure time period, the blur correction is continuously performed, so that the shot image is obtained as a blur-free image.

After the blur correction is stopped in the next step SP59, the operation of reading the image signal from the CCD 5 is started in step SP61. If predetermined conditions are satisfied, the operation of dust removal is performed simultaneously with the operation of reading the image signal from the CCD 5 (step SP64). In this case, only when such a condition that the digital camera 10 is held in the normal posture is satisfied, the dust removal operation is started.

Therefore, the posture of the digital camera 10 is detected (step SP62) and whether the digital camera 10 is held in the normal posture is determined (step SP63).

If the digital camera 10 is not held in the normal posture, the dust removal operation is not performed and the operation of centering the CCD 5 is performed in preparation for the next shooting (step SP69).

On the other hand, if the digital camera 10 is held in the normal posture, the dust removal operation (steps SP64 to SP68) is performed.

Specifically, in step SP64, vibrating the CCD 5 is started to start dust removal. The CCD 5 is continuously vibrated at least until reading the image signal is finished (step SP65). The CCD 5 is continuously vibrated for predetermined time (period) T3 (e.g., five seconds) and the vibration is stopped after a lapse of the time T3 since the start (steps SP66, S68). When a shooting preparation instruction for the next image to be shot is given (for example, the shutter release is pressed halfway down), vibrating the CCD 5 is stopped even if the time T3 has not elapsed (steps SP67, SP68). Then, the operation of centering the CCD 5 is performed in preparation for the next shooting (step SP69). In this case, it is assumed that the time T3 is set longer than the time required for reading the image signal. The time T3 is not limited to this case and may be set to be equivalent to or shorter than the time required for reading the image signal.

The image signal read from the CCD 5 is subjected to predetermined processes through the A/D converter 21 and the image processor 22 and is then stored into a memory card 91. The predetermined processes are performed simultaneously with the dust removal operation.

After that, if the operation of shooting an image in the shooting mode is continued, the operation is returned to step SP51 and the similar steps are repeated.

As described above, in the digital camera 10 according to the third embodiment, the operation (dust removal operation) of vibrating the imaging device to remove dust deposited on the imaging device is performed after the completion of exposure for shooting of an image until the operation of preparing for the next shooting of an image. Since the dust removal operation is automatically performed during the shooting mode (in brief, during shooting), the dust removal operation can be performed without switching the mode to the dust removal mode, resulting in improvement of convenience. In particular, since the CCD 5 is vibrated while an image signal is being read from the CCD 5, dust can be removed at the early stage after the completion of exposure. In other words, a time interval between shootings can be very efficiently utilized.

In addition, since the dust removal operation is performed so long as the digital camera 1C is held in the normal posture, dust can be more reliably collected.

Therefore, dust can be prevented from being again deposited, thus allowing for efficient dust removal.

4. Modifications

The above-described third embodiment has described the case where the dust removal operation is performed every shooting of an image (i.e., every frame shooting). The invention is not limited to this case. For example, the dust removal operation may be performed each time, for example, a plurality of (e.g., several) images are shot.

The principle of the third embodiment can be applied to not only single shooting but also continuous shooting. During continuous shooting, time T3 during which the CCD 5 is continuously vibrated may be set (to, for example, 0.3 to 0.5 seconds) shorter than that for single shooting.

Figure 15:
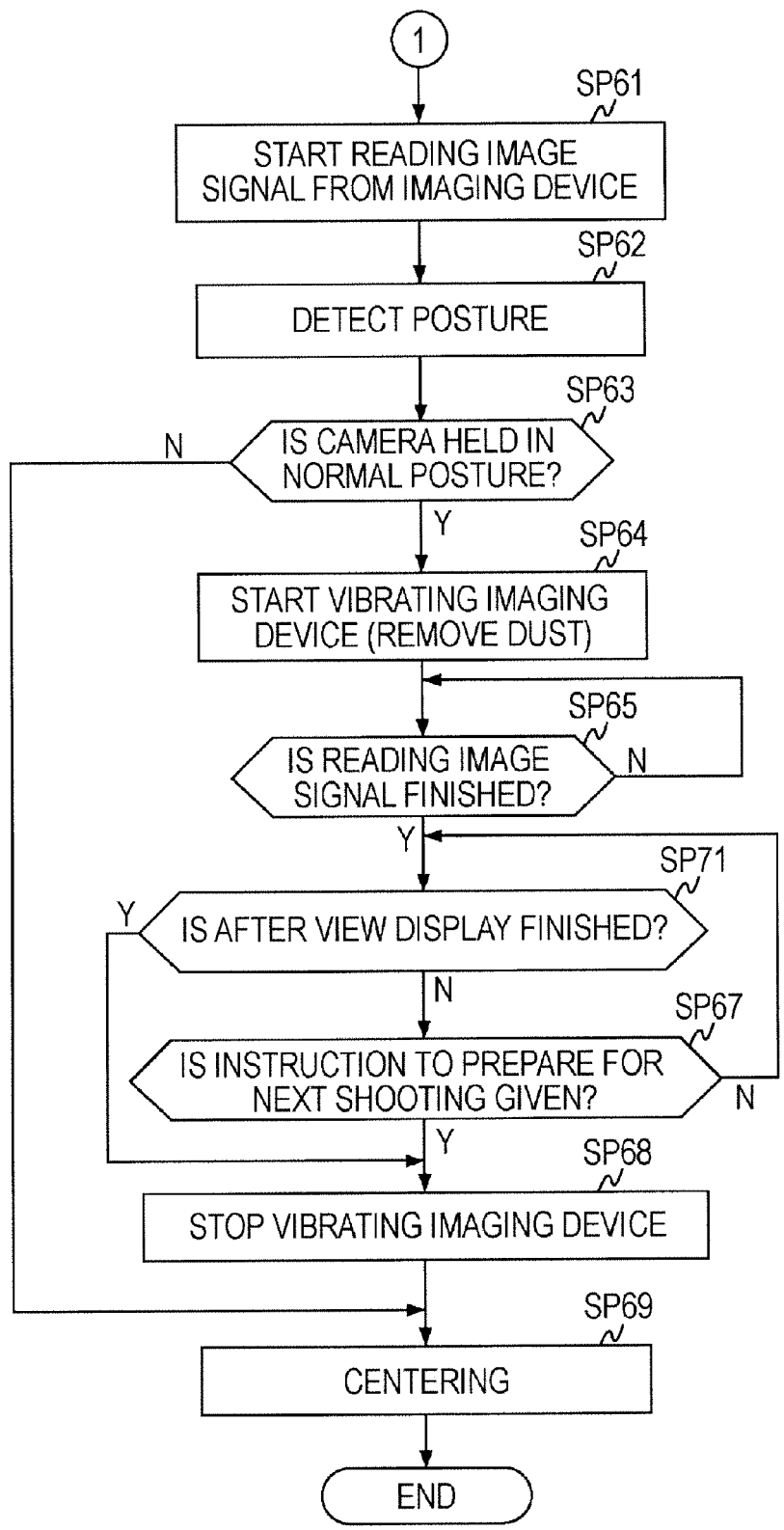
FIG. 15 is a flowchart showing the operation according to a modification.

The above-described third embodiment has also described the case where after the completion of exposure in the shooting mode, the dust removal operation is performed for a predetermined period since the start of reading an image signal from the CCD 5. The present invention is not limited to this case. For example, the dust removal operation may be performed during after view display following the completion of exposure in the shooting mode. FIG. 15 is a flowchart showing the above modification. Steps shown in FIG. 15 may be performed instead of the steps shown in FIG. 14. As for after view, a shot image is automatically displayed on the display unit 63 for a predetermined period immediately after the completion of the shooting operation. Whether the shot image has been captured as the user intended can be confirmed using after view.

Referring to FIG. 15, in principle, the dust removal operation started in step SP64 is continued until after view display is finished (steps SP71, SP68). When a shooting preparation instruction for the next image to be shot is given (e.g., the shutter release is pressed halfway down), vibrating the CCD 5 is stopped even if the after view display is not finished. Thus, the dust removal operation is finished (steps SP67, SP68).

The respective steps shown in FIG. 15 can obtain the same advantages as those obtained in the third embodiment.

The foregoing second embodiment has described the case where during reading of data from the CCD 5, the CCD 5 is vibrated on the condition that the digital camera 1B is held in the normal posture. The present invention is not limited to this case. For example, the CCD 5 may be vibrated irrespective of the posture of the digital camera 1. In this case, preferably, the dust absorbing member 81 is arranged in the vicinity of each of the upper, lower, left, and right edges of the CCD 5 so as to reliably absorb dust removed from the CCD 5.

The above-described embodiments have described the lens interchangeable digital camera 1. Techniques related to the present application (e.g., techniques related to the second and third embodiments) can be applied to imaging apparatuses that are not of the lens interchangeable type. When an imaging apparatus is not of the lens interchangeable type, dust may be generated due to driving of an internal mechanism. If dust is deposited on an imaging device, cleaning is not performed because the lens is not detached. Unfortunately, cleaning is a problem difficult to solve. When the techniques related to this application are applied to such an imaging apparatus that is not of the lens interchangeable type, dust deposited on the imaging device can be removed. Since dust is easily deposited on an imaging device of a lens interchangeable imaging apparatus, the techniques related to this application enhance the effect on lens interchangeable imaging apparatuses.

In the above-described embodiments, a warning (information) to the user is realized by displaying a predetermined message on the display unit 63. The present invention is not limited to this case. For example, a warning may be realized using speech output.

The above-described embodiments have described that the CPU performs arithmetic processing in accordance with the program to realize various functions. All or part of the functions may be realized by a special-purpose electrical circuit. In particular, a mechanism for repeat arithmetic processing is constructed using logic circuits, thus realizing high speed processing.

The invention claimed is:

1. An imaging apparatus, comprising:
   an imaging device to convert an optical image of a subject into an image signal; and
   means for vibrating the imaging device to remove dust deposited on the imaging device after completion of an exposure of an image shot by the imaging device during reading of an image signal from the image device.

2. The imaging apparatus according to claim 1, further comprising:
   means for displaying an after-view image of the shot image, wherein
   the means for vibrating vibrates the imaging device during display of the after-view image of the shot image.

3. The imaging apparatus according to claim 1, wherein the means for vibrating vibrates the imaging device for a predetermined period after completion of the exposure of the image shot by the imaging device.

4. The imaging apparatus according to claim 3, wherein the means for vibrating stops the vibration of the imaging device when a shooting preparation instruction related to a next image to be shot is given during the predetermined period.

5. The imaging apparatus according to claim 2, wherein the means for vibrating vibrates the imaging device for a predetermined period after completion of the exposure of the image shot by the imaging device.

6. An imaging apparatus, comprising:
   an imaging device to convert an optical image of a subject into an image signal;
   a driving unit to vibrate the imaging device; and
   a control unit to control the driving unit to vibrate the imaging device during reading of the image signal from the imaging device after a completion of exposure of an image shot by the imaging device to remove dust deposited on the imaging device.

7. The imaging apparatus according to claim 6, further comprising:
   a display unit to display an after-view image of the shot image, wherein
   the control unit is configured to control the driving unit to vibrate the imaging device during display of the after-view image of the shot image.

8. The imaging apparatus according to claim 6, wherein the control unit is configured to control the driving unit to vibrate for a predetermined period after completion of the exposure of the image shot by the imaging device.

9. The imaging apparatus according to claim 6, wherein the control unit is configured to stop the vibration of the imaging device when a shooting preparation instruction related to a next image to be shot is given during the predetermined period.

* * * * *